United States Patent
Andarawis et al.

(10) Patent No.: US 8,269,509 B2
(45) Date of Patent: Sep. 18, 2012

(54) SYSTEM AND METHOD FOR MEASURING THICKNESS OF A REFRACTORY WALL OF A GASIFIER USING ELECTROMAGNETIC ENERGY

(75) Inventors: Emad Andarawis Andarawis, Ballston Lake, NY (US); John Erik Hershey, Ballston Lake, NY (US); Ibrahim Issoufou Kouada, Niskayuna, NY (US); Shobhana Mani, Houston, TX (US); Anthony Mark Thompson, Aliso Viejo, CA (US)

(73) Assignee: General Electric Company, Niskayuna, NY (US)

( * ) Notice: Subject to any disclaimer, the term of this patent is extended or adjusted under 35 U.S.C. 154(b) by 351 days.

(21) Appl. No.: 12/272,310

(22) Filed: Nov. 17, 2008

(65) Prior Publication Data
US 2010/0123467 A1 May 20, 2010

(51) Int. Cl.
*G01R 27/32* (2006.01)

(52) U.S. Cl. ....................................................... 324/644

(58) Field of Classification Search .................... 324/644
See application file for complete search history.

(56) References Cited

U.S. PATENT DOCUMENTS

| | | | | |
|---|---|---|---|---|
| 3,701,518 A * | 10/1972 | Herff | | 266/86 |
| 4,872,345 A | 10/1989 | Dicks | | |
| 5,075,863 A * | 12/1991 | Nagamune et al. | | 702/159 |
| 5,475,309 A * | 12/1995 | Hong et al. | | 324/338 |
| 6,198,293 B1 * | 3/2001 | Woskov et al. | | 324/637 |

* cited by examiner

*Primary Examiner* — Amy He
(74) *Attorney, Agent, or Firm* — Ann M. Agosti

(57) ABSTRACT

A system and method for measuring a thickness of a refractory wall of a gasifier using electromagnetic energy is disclosed. The system includes a waveguide with a bistatic or monostatic phased array antenna at one end. The waveguide is operably connected to a Network Analyzer that generates a pulse of electromagnetic energy with a desired bandwidth. The pulse is transmitted through a coaxial cable to the waveguide. The reflection of the pulse is received by the waveguide and input to a data acquisition system. An output device displays the resolvable discontinuities in impedance encountered by the pulse in its propagation path in the system.

12 Claims, 2 Drawing Sheets

SYSTEM AND METHOD FOR MEASURING THICKNESS OF A REFRACTORY WALL OF A GASIFIER USING ELECTROMAGNETIC ENERGY

BACKGROUND

This invention relates generally to time domain reflectometry (TDR) measurements, and more particularly to a system and method for measuring a thickness of refractory walls of a gasifier using electromagnetic energy.

The wall thickness of the refractory bricks in a gasifier is a critical parameter of the unit's health and its need for maintenance and repair. As the gasifier operates, slag moves over and accumulates on the walls. This byproduct of the gasification process can significantly erode and damage the refractory brick lining.

A number of current measurement techniques for estimating the thickness of slag on the lining of refractory bricks rely on human measurements and visual inspection of the structure. Human inspection of the bricks requires that the gasifier be cooled down completely before the measurement can be undertaken. It requires a large amount of time to cool the gasifier sufficiently. Therefore, it is desirable to provide an apparatus for estimating the thickness of the refractory lining that is capable of high temperature operation to reduce the cooling time after shut-down. It is also desirable to provide a method that records the thickness profile for comparing changes over a period of time, and hence allowing tracking of trends in brick wear or slag penetration over a period of time.

SUMMARY OF THE INVENTION

Briefly, a method for measuring thickness of refractory bricks in a gasifier using electromagnetic energy comprising the steps of:

positioning a waveguide within the gasifier;

emitting pulses of electromagnetic energy from the waveguide toward the refractory bricks;

receiving the pulses of electromagnetic energy reflected from the refractory bricks; and processing a signal from the received pulses of electromagnetic energy to determine a thickness of the refractory bricks.

In yet another aspect of the invention, a system for measuring thickness of refractory bricks in a gasifier using electromagnetic energy, comprising:

a network analyzer for generating pulses of electromagnetic energy;

a waveguide positioned within the gasifier, the waveguide operatively coupled to the network analyzer, one end of the waveguide emitting the pulses of electromagnetic energy toward the refractory bricks and receiving the pulses of electromagnetic energy reflected from the refractory bricks; and a processor for processing a signal from the receiver to determine a thickness of the refractory bricks.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Time Domain Reflectometry (TDR) measurements are based on reflections of microwave signals that occur at interfaces between impedance mismatches. A transmission line that has uniform impedance and terminates with impedance that is equal to the impedance of the transmission line will not exhibit any reflection. In the matched impedance case, the signal power is all absorbed in the termination, and thus no reflection occurs. At points where the signal experiences an impedance mismatch, a reflection occurs. The magnitude and phase of the reflection are given by the complex reflection coefficient $$\rho = \frac{Z_\tau - Z_0}{Z_\tau + Z_0},$$

where $Z_0$ is the complex characteristic impedance of the transmission line, and $Z_\tau$ is the complex termination impedance.

Furthermore, the time delay between the incident signal and the reflection is a function of the distance between the source and the reflecting interface, as well as the electrical properties of the propagation media. The propagation velocity of electromagnetic waves through a material is given by $$V = \frac{c}{\sqrt{\varepsilon_r}},$$

where c is the speed of light in a vacuum (about $3 \times 10^8$ m/s), and $\varepsilon_r$ is the dielectric constant of the propagation medium.

Time of flight measurements can therefore be used to determine the thickness of the various constituting media in which the RF signal is traveling. In this kind of measurement, three variables (the time of flight (TOF), the thickness (L) and the relative permittivity of the medium($\varepsilon_r$)) are correlated by the following equation:

$$L = \frac{TOF * c}{2 * \sqrt{\varepsilon_r}}, \quad (1)$$

which can be rewritten as follows:

$$\sqrt{\varepsilon_r} = \frac{TOF * c}{2 * L} \quad (2)$$

The factor of two appearing in the denominator of Equation (2) is due to the TDR measurement being reflection based, and thus any reflections received at the transmitter have gone through a round trip delay through the medium of interest. Transmission based measurements can also be used with a transmitter and receiver not co-located, but are on opposite sides of the structure being measured.

In another embodiment, transmission based measurements are used with a transmitter and receiver not co-located, but are on opposite sides of the structure being measured. In this case, the RF signal will only undergo a one-way delay through the medium of interest.

Figure 1:
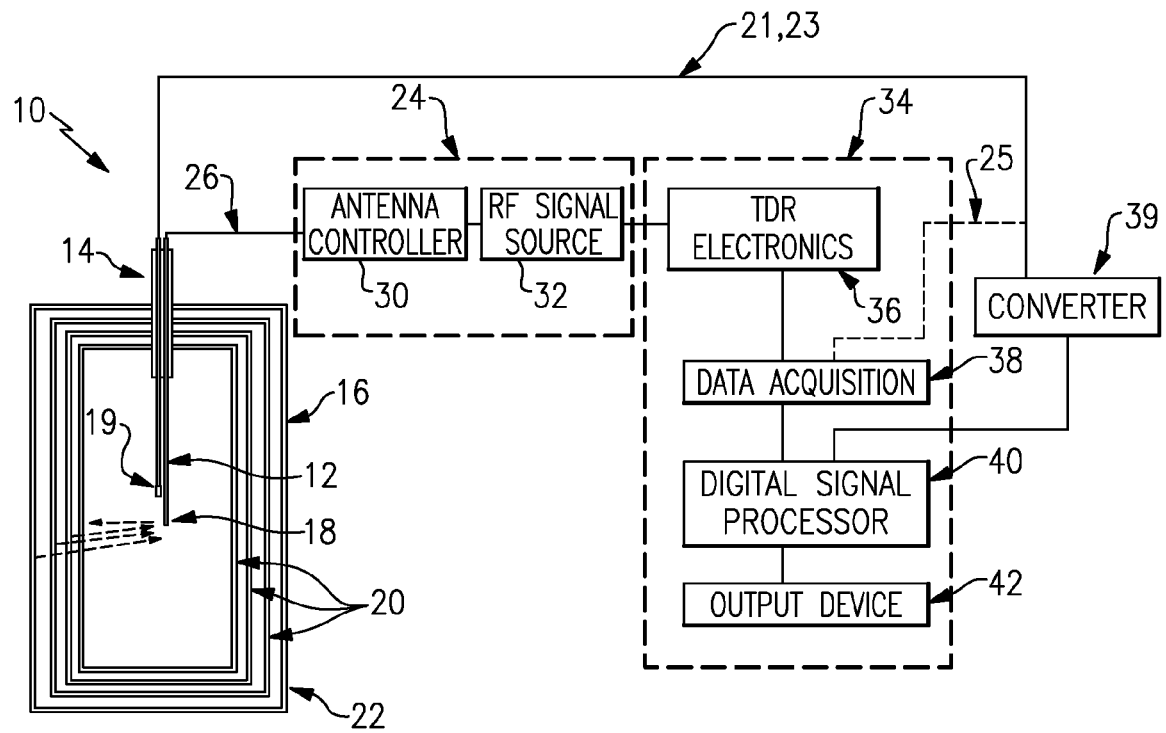
FIG. 1 is a schematic representation of a system for measuring thickness of refractory bricks in a gasifier using electromagnetic energy according to an embodiment of the invention.

Referring now to FIG. 1, a schematic representation of a system for measuring thickness of refractory bricks in a gasifier using a radar probe that emits electromagnetic energy is shown according to an embodiment of the invention. The system, shown generally at 10, includes one or more waveguides 12 fed through a feed injector port 14 and positioned within the gasifier, shown generally at 16. The one or more waveguides 12 are composed of one or more metal tubes that make a smooth transition for the microwave signal from the cable to the air. The interface between a tube end and the air may also comprise a phase delay element (not shown) that would function to shape the radiation pattern of the antenna. The one or more waveguides 12 are made of a metal that can withstand the temperature associated with cool down conditions in the gasifier 16. The dimensions of the one or more waveguides 12 are directly correlated to their cutoff frequencies and operating bandwidths.

One or more of the ends of some of the one or more waveguides 12 form an antenna 18 that emits steps or pulses of electromagnetic energy toward the refractory bricks 20 of the gasifier 16. The antenna 18 may be a phased array antenna. In the embodiment comprising monostatic operation, the same one or more ends of some of the waveguides 12 are used to transmit electromagnetic pulses and to receive echoes of those transmitted pulses. In the embodiment comprising bistatic operation, a plurality of waveguides 12 and a different set of the one or more ends of the some of the waveguides 12 are used to transmit electromagnetic pulses than the one or more ends of the waveguides are used to receive echoes of those transmitted pulses. The one or more ends of the waveguides 12 are used for receiving pulses in a bistatic operation are generally spatially separated by many diameters of the waveguides from the ends of the waveguides 12 are used for transmitting pulses. In the illustrated embodiment, the shell 22 of the gasifier 16 is formed of three (3) layers of refractory bricks 20. However, it will be appreciated that the invention is not limited by the number of layers of refractory bricks, and that the invention can be practiced with fewer or larger numbers of layers of refractory bricks forming the shell 22 of the gasifier 16.

The one or more waveguides 12 are operably connected to a radar transceiver, shown generally at 24. The radar transceiver 24 may be an off-the-shelf unit that is commercially available. The radar transceiver 24 is programmed to generate an electromagnetic signal with a desired bandwidth, such as with an industrial, scientific and medical (ISM) radio bandwidth. The radar transceiver 24 may include an antenna controller 30 and a RF signal source 32 that generates the pulses of electromagnetic energy with the desired bandwidth.

The ISM radio bandwidths were originally reserved for the use of RF electromagnetic fields for industrial, scientific and medical purposes. In general, communications equipment that operates in an ISM band must accept any interference generated by ISM equipment.

The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are often used for unlicensed operation. In the United States of America, ISM uses of the ISM bands are governed by Part 18 of the FCC rules, while Part 15 Subpart B contains the rules for unlicensed communication devices, even those that use the ISM frequencies. Thus, designers of equipment for use in the United States in the ISM bands should be familiar with the relevant portions of both Part 18 and Part 15 Subpart B of the FCC Rules.

A commonly encountered ISM device is the home microwave oven operating at 2.45 GHz. These bands have also been shared with license-free error-tolerant communications applications such as wireless LANs and cordless phones in the 915 MHz, 2450 MHz, and 5800 MHz bands. Because licensed devices already are required to be tolerant of ISM emissions in these bands, unlicensed low power uses are generally able to operate in these bands without causing problems for licensed uses. The ISM band is also widely used for Radio-frequency identification (RFID) applications with the most commonly used band being the 13.56 MHz band used by systems compliant with ISO/IEC 14443 including those used by biometric passports and contactless smart cards. One example of an ISM band that can be used in the system and method of the invention is the 2.4-2.5 GHz band. However, it will be appreciated that the invention is not limited by the frequency of the electromagnetic energy.

The pulses of electromagnetic energy generated by the radar transceiver 24 are transmitted through one or more coaxial cables 26 to the one or more waveguides 12 used for transmitting electromagnetic pulses toward the bricks 20. The reflection of the pulse is received by one or more of the waveguides 12, and the received pulses are input to a data acquisition system, shown generally at 34, through an instrument control interface such as GPIB. The data acquisition system 34 may include, for example, TDR electronics 36 that selects an appropriate time domain transform, a data acquisition section 38 for storing a series of received signals, a digital signal processor 40, such as a personal computer (PC) and the like, and an output device 42 that displays the resolvable discontinuities in impedance encountered by the microwave signal in its propagation path in the system 10.

The time-of-flight calculation may be affected by the chromia brick temperature. In order to perform this correction, it is necessary to estimate the temperature of the chromia bricks. This may be done by incorporating a temperature sensor along with the radar probe.

In an alternative embodiment, a temperature sensor 19 is proximate the antenna 18. The temperature sensor 19 may be a thermocouple and connected to a converter 39 that converts the thermocouple state into a digital form that is passed to the digital signal processor 40. In this embodiment, the temperature sensor 19 is connected to the converter 39 by an electrical cabling 21.

In a further embodiment, the temperature sensor 19 may be an optical aperture, such as a pyrometer front-end that is connected to the converter 39 that translates the optical input into a digital form that is passed to the digital signal processor 40. In this embodiment, the temperature sensor 19 is connected to the converter 39 by an optical fiber 23.

In yet another embodiment, the analog data that is carried on either the electrical cabling 21 or the optical fiber 23 to the data acquisition module 38 (indicated by the dashed line 25) and combined in analog form with the analog radar data from the antenna 18 before being passed to the digital signal processor 40.

Figure 1A:
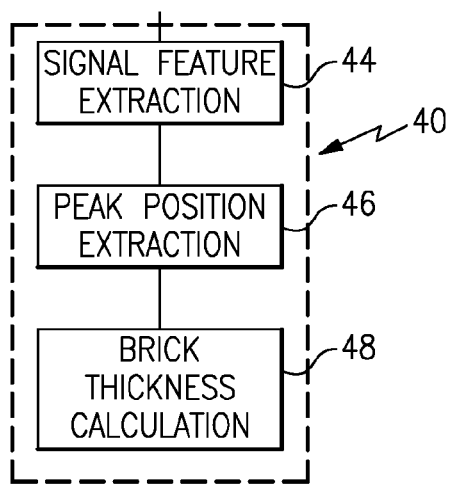
FIG. 1A is a schematic representation of a digital signal processor according to an embodiment of the invention.

Referring now to FIG. 1A, a schematic representation of the digital signal processor 40 is shown according to an embodiment of the invention. The digital signal processor 40 includes an extraction section 44 for extracting signal features, a peak position analyzer 46 to determine the location of the signal peak, and a calculation section 48 to determine a thickness of the refractory bricks 20.

Figure 2:
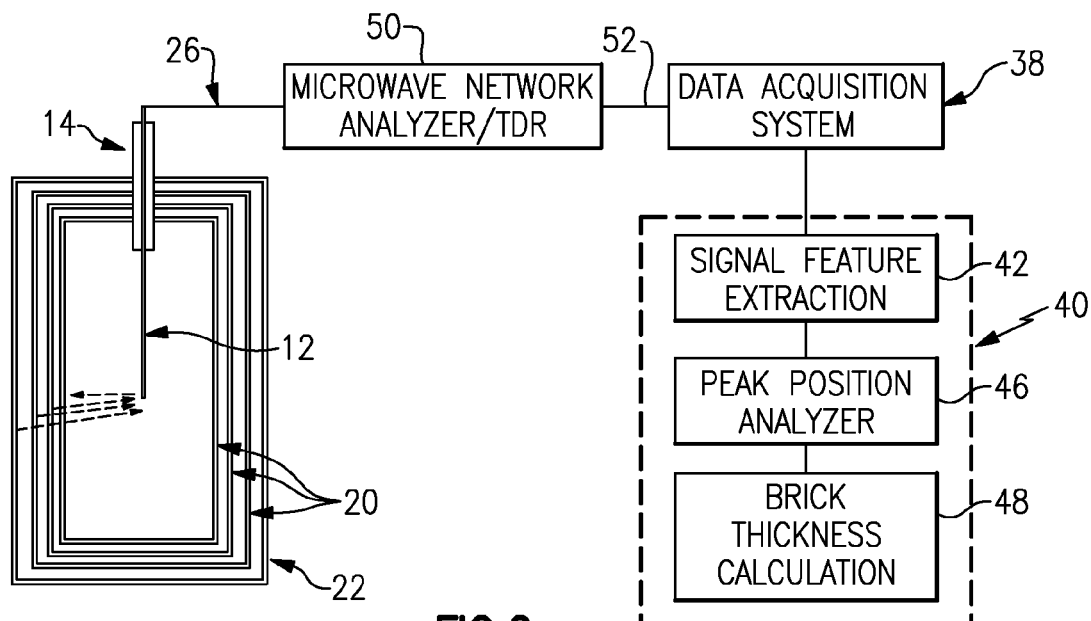
FIG. 2 is a schematic representation of a test system for measuring thickness of refractory bricks in a gasifier using electromagnetic energy according to an embodiment of the invention.

Tests were conducted to validate the feasibility of the system and method of the invention to measure the thickness of one or more sample refractory bricks 20. FIG. 2 shows a schematic of the test setup for field validation of the measurement technique. An off the shelf network analyzer 50 was used in conjunction with the data acquisition system 38 through an instrument control interface 52, such as GPIB. The data was then analyzed using the digital signal processor 40 to obtain the brick thickness information.

Figure 3:
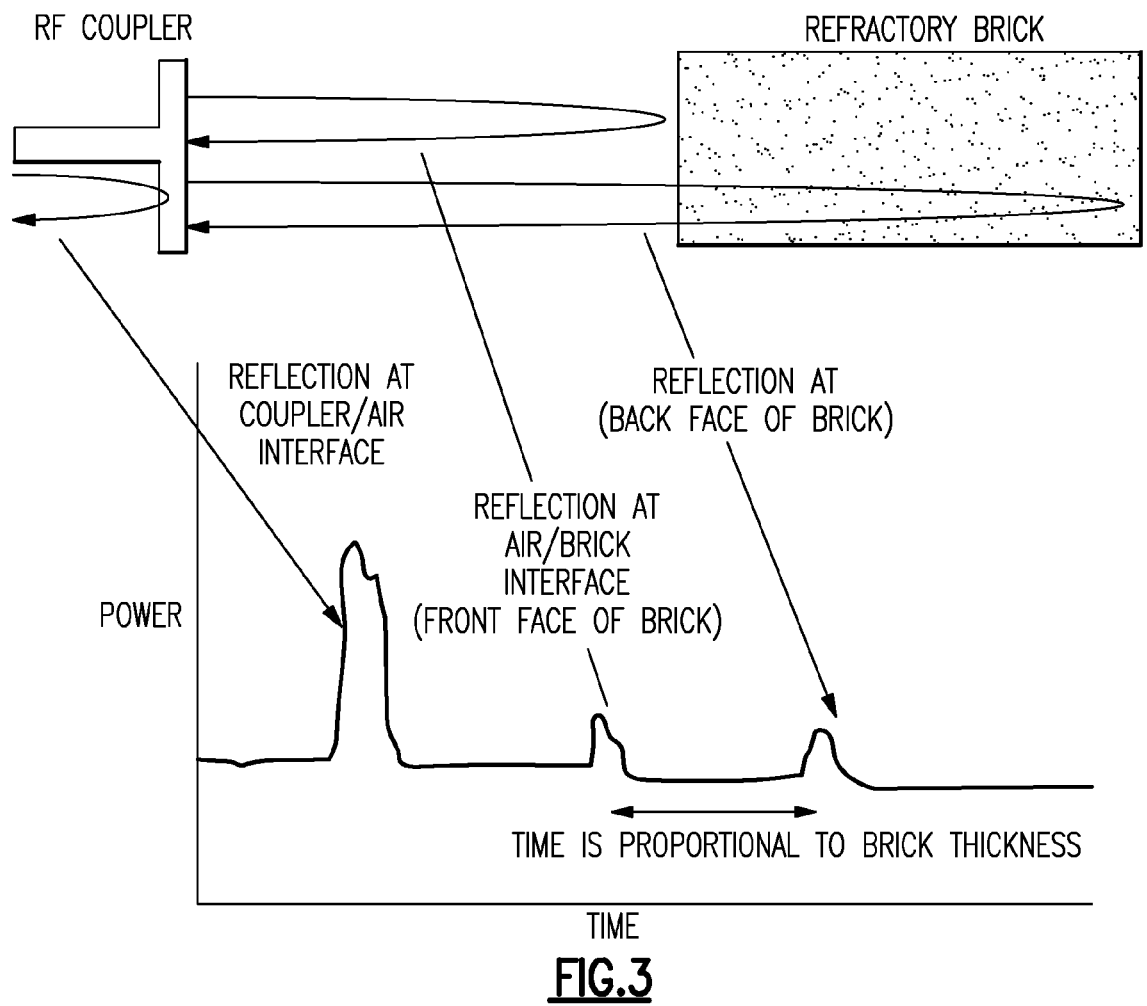
FIGS. 3 is a graphical representation of reflected power as a function of time from the coupler/air interface, the front face of a refractory brick, and the rear face of the refractory brick.

A typical graph of reflected power as a function of time is shown in FIG. 3. The results of the tests proved that the time of flight (TOF) remains substantially constant for each dimension of the refractory bricks, thereby providing an accurate measurement of the thickness of each dimension of the bricks. In addition, only minor changes in the relative permittivity (dielectric constant) were observed between clean refractory bricks and refractory bricks with slag. Specifically, the relative permittivity increases slightly in the refractory bricks with slag, as compared to clean refractory bricks, which is understandable because the slag occupies the cavities in the brick, and therefore replaces the air in those cavities. For example, the relative permittivity in a clean AUREX 75 brick was about 3.0, while the relative permittivity in the same AUREX 75 brick with slag was about 3.2.

Tests were conducted to evaluate if the method of the invention could be used to determine the discontinuities in between three refractory bricks immediately adjacent to one another, similar to the environment in a gasifier. The three bricks that were tested were the AUREX 75, RUBY, and CLIPPER DP. The results from tests indicate that the interfaces between the bricks were clearly detected and the thicknesses of each brick were accurately measured.

As described above, a system and method measures a thickness of refractory bricks in a gasifier using electromagnetic energy, such as microwaves, and the like. In the method, the time delays are used to calculate brick thicknesses and refractory health assessment is made based on the calculated thicknesses. In an embodiment, a measurement can be made in the gasifier prior to initial operation to obtain a brick thickness baseline measurement that takes into account variations in the relative permittivity from one brick to another. Subsequent measurements can be compared to the baseline measurement, and trends as a function of time can be assessed. Acceleration in the wear rate of the refractory bricks can be flagged, and service intervals can be appropriately adjusted.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for measuring thickness of refractory bricks in a gasifier using electromagnetic energy comprising the steps of:
    positioning at least one waveguide within the gasifier;
    emitting pulses of electromagnetic energy from the at least one waveguide toward the refractory bricks;
    receiving the pulses of electromagnetic energy reflected from the refractory bricks; and
    processing a signal from the received pulses of electromagnetic energy to determine a thickness of the refractory bricks,
    wherein the thickness of the refractory bricks is made prior to startup of the gasifier to obtain a baseline measurement of brick thickness, and
    wherein the thickness of the refractory bricks is made subsequent to startup of the gasifier and compared to the baseline measurement to provide a trend of the thickness of the refractory bricks as a function of time.

2. The method according to claim 1, further comprising the step of assessing refractory health based on the thickness of the refractory bricks.

3. The method according to claim 1, further comprising the step of determining an acceleration of wear of the refractory bricks based on the trend of the thickness of the refractory bricks as a function of time.

4. The method of claim 3, further comprising the step of adjusting a service interval of the gasifier based on the acceleration of wear of the refractory bricks.

5. The method of claim 1, further comprising the step of measuring a temperature of the refractory bricks.

6. The method of claim 5, further comprising the step of estimating a temperature correction to the thickness of the refractory bricks.

7. A system for measuring thickness of refractory bricks in a gasifier using electromagnetic energy, comprising:
    a network analyzer for generating pulses of electromagnetic energy;
    a waveguide positioned within the gasifier, the waveguide operatively coupled to the network analyzer, an end of the waveguide emitting pulses of electromagnetic energy toward the refractory bricks and the end of the waveguide receiving the pulses of electromagnetic energy reflected from the refractory bricks; and
    a processor for processing the signal from the received pulses of electromagnetic energy to determine a thickness of the refractory bricks,
    wherein the thickness of the refractory bricks is made prior to startup of the gasifier to obtain a baseline measurement of brick thickness, and
    wherein the thickness of the refractory bricks is made subsequent to startup of the gasifier and compared to the baseline measurement to provide a trend of the thickness of the refractory bricks as a function of time.

8. The system according to claim 7, further comprising at least two waveguides, and wherein the system operates in a bistatic mode.

9. The system according to claim 7, wherein the system operates in a monostatic mode.

10. The system according to claim 7, wherein the waveguide comprises a phase delay element.

11. The system according to claim 7, further comprising a thermocouple proximate the end of the waveguide to measure a temperature of the refractory bricks.

12. The system according to claim 11, further comprising a converter for converting an analog signal from the thermocouple to a digital signal, wherein the digital signal is transmitted to the processor, and wherein the processor estimates a temperature correction to the thickness of the refractor bricks.

* * * * *